(12) United States Patent
Yacoub

(10) Patent No.: US 9,593,648 B2
(45) Date of Patent: Mar. 14, 2017

(54) OPERATING METHOD FOR A PARTICLE FILTER

(71) Applicant: Ford Global Technologies, LLC, Dearborn, MI (US)

(72) Inventor: Yasser Mohamed sayed Yacoub, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 135 days.

(21) Appl. No.: 13/830,518

(22) Filed: Mar. 14, 2013

(65) Prior Publication Data
US 2013/0239800 A1     Sep. 19, 2013

(30) Foreign Application Priority Data
Mar. 15, 2012   (DE) .................. 10 2012 204 099

(51) Int. Cl.
| | | |
|---|---|---|
| B01D 46/46 | (2006.01) | |
| F02M 35/08 | (2006.01) | |
| F01N 3/30 | (2006.01) | |
| F01N 3/023 | (2006.01) | |
| F01N 9/00 | (2006.01) | |

(52) U.S. Cl.
CPC ............ *F02M 35/08* (2013.01); *F01N 3/023* (2013.01); *F01N 3/30* (2013.01); *F01N 9/002* (2013.01); *F01N 2260/08* (2013.01); *F01N 2270/00* (2013.01); *F01N 2900/1411* (2013.01); *Y02T 10/47* (2013.01)

(58) Field of Classification Search
CPC ... Y02T 10/47; B01D 46/0057; F02D 41/029; F02D 2200/0812; F02D 41/027; F02N 9/002; F01N 3/023

USPC ............................................................... 95/14
See application file for complete search history.

(56) References Cited

U.S. PATENT DOCUMENTS

| | | | | |
|---|---|---|---|---|
| 4,583,363 | A * | 4/1986 | Urushidani et al. ............ | 60/276 |
| 5,184,462 | A * | 2/1993 | Schatz ............................ | 60/274 |
| 5,826,428 | A * | 10/1998 | Blaschke ........................ | 60/303 |
| 7,197,867 | B2 * | 4/2007 | Huang et al. ................... | 60/295 |
| 8,096,111 | B2 * | 1/2012 | Hoard et al. .................... | 60/295 |
| 8,756,917 | B2 * | 6/2014 | Gonze et al. ................... | 60/286 |
| 2002/0007629 | A1 * | 1/2002 | Asanuma et al. .............. | 60/297 |
| 2002/0157386 | A1 * | 10/2002 | Hiranuma et al. ............. | 60/295 |
| 2004/0211170 | A1 * | 10/2004 | Koyama et al. ................ | 60/277 |
| 2006/0021332 | A1 * | 2/2006 | Gaiser ............................ | 60/286 |
| 2006/0048760 | A1 * | 3/2006 | Matsunaga et al. ..... | 123/568.21 |

(Continued)

FOREIGN PATENT DOCUMENTS

| | | |
|---|---|---|
| DE | 10345986 A1 | 4/2005 |
| DE | 102004046638 A1 | 3/2006 |
| EP | 1630369 A2 | 3/2006 |

*Primary Examiner* — Amber R Orlando
(74) *Attorney, Agent, or Firm* — Julia Voutyras; John D. Russell; B. Anna McCoy

(57) ABSTRACT

The systems and methods herein relate the operation of a particle filter which is arranged in an exhaust-gas path of an internal combustion engine, to a device for exhaust-gas aftertreatment which can be operated in accordance with the method that comprises determining a mass flow rate of an exhaust-gas flow flowing in the exhaust-gas path; and supplying ambient air into the exhaust-gas path as a function of the determined mass flow rate. By this method, the spontaneous regeneration of a particle filter within the exhaust system may be abated.

17 Claims, 4 Drawing Sheets

(56) References Cited

U.S. PATENT DOCUMENTS

| | | | |
|---|---|---|---|
| 2007/0044454 A1* | 3/2007 | Bonadies et al. | 60/289 |
| 2009/0266060 A1* | 10/2009 | Guo | F02D 41/029 60/295 |
| 2010/0050999 A1* | 3/2010 | Murata et al. | 123/568.11 |
| 2011/0072794 A1* | 3/2011 | Van Nieuwstadt et al. | 60/285 |
| 2011/0072802 A1* | 3/2011 | Bidner et al. | 60/287 |
| 2011/0173953 A1* | 7/2011 | Neels et al. | 60/274 |
| 2011/0258986 A1* | 10/2011 | Fath | 60/274 |
| 2011/0270499 A1* | 11/2011 | Saito | 701/55 |
| 2012/0124978 A1* | 5/2012 | Futonagane et al. | 60/311 |
| 2013/0061579 A1* | 3/2013 | Kotrba et al. | 60/295 |

\* cited by examiner

OPERATING METHOD FOR A PARTICLE FILTER

CROSS REFERENCE TO RELATED APPLICATIONS

The present application claims priority to German Patent Application 102012204099.4, filed on Mar. 15, 2012, the entire contents of which are hereby incorporated by reference for all purposes.

BACKGROUND AND SUMMARY

The systems and methods herein relate to the operation of a particle filter, within an exhaust-gas path of an internal combustion engine that is coupled to an exhaust-gas aftertreatment device which may be operated in accordance with a method of operation of a motor vehicle.

In wall-flow particle filters, such as soot filters in internal combustion engines, solid material is filtered out of exhaust gas stored on the wall of the substrate of the particle filter. Particles removed by a properly functioning filter from exhaust gas reduce undesirable emissions to meet emissions and operation standards.

The continuous operation of a particle filter may be limited by its absorption capacity. A process called regeneration allows the filter to be restored to its original absorption capacity and operating efficiency without replacing the filter. Regular regeneration allows the filter to continuous and consistent operation. Further, extended use of a particle filter may contribute to counter-pressure within the exhaust system resulting from an increasing impermeability of the filter as the amount of solid particle content increases. An increase in engine load from exhaust-gas counter-pressure exerted on the engine by the filter may also be alleviated by restoring filter permeability via a regular regeneration.

During the regeneration of the particle filter, the solid material deposited in the particle filter is burned off. The combustion process may be initiated in a targeted manner by introducing within the exhaust system a rich fuel mixture in which air-to-fuel ratio is decreased so that exhaust gas contains still-unburned fuel after combustion and prior to entering the particle filter. The presence of unburned fuel may trigger a secondary combustion within the filter. Regeneration may also be initiated by introducing very high heat into the exhaust system.

If the regeneration is not performed regularly in order to limit the amount of deposited solid material, a spontaneous combustion may occur, which may degrade the filter and engine. During the combustion process, temperatures of over 600 degrees Celsius may be reached, which may degrade the substrate of the particle filter. The risk of damage is particularly high if the combustion process takes place in an uncontrolled manner that may be initiated, for example, by an unexpectedly high amount of deposited solid material. It is therefore desirable to keep the interval between two regenerations below a threshold. However, regular controlled regeneration cycles increase the fuel consumption. Further, regeneration may not be possible in all operating conditions.

The inventors found that by supplying ambient air to the exhaust gas path at a rate dependent on a measured mass airflow rate (MAF) and/or filter temperature, uncontrolled regeneration may be abated. This is because the mass flow rate of the exhaust-gas flow is generally a function of the presiding operating state of the internal combustion engine producing the exhaust-gas flow. Additionally, the temperature within the filter is generally indicative of the impending of potential spontaneous regeneration. Thus, by allowing ambient air to enter the filter at a controlled rate the cooling of the filter may be controlled, particularly in situations that may contribute to spontaneous regeneration.

It should be understood that the background and summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
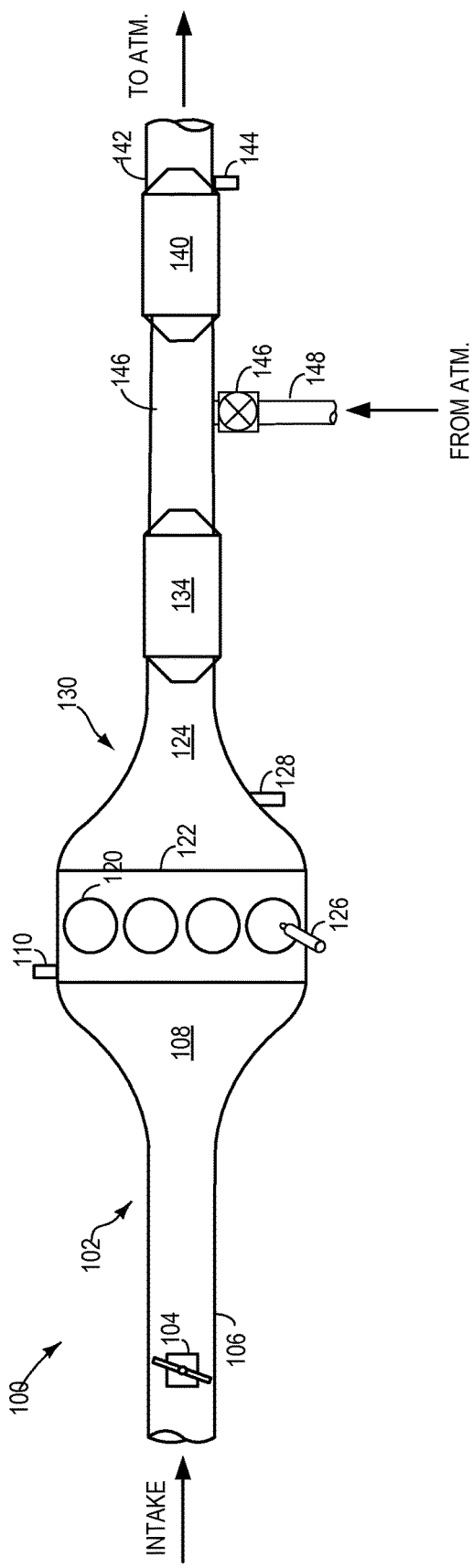
FIG. 1 is an example embodiment of an engine's intake and exhaust system.
Figure 1:
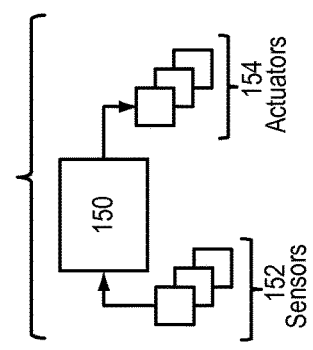

Exhaust gas after-treatment devices (EG-ATDs) may be embodied as wall-flow particle filters. Wall flow particle filters work to remove solid material present within the exhaust gas, such as soot, and store the removed particles in the substrate wall of the filter. The volume of wall-flow filters is limited so that, after a period of operation, the filter may become full and may lose its capacity to continue to store removed particles from exhaust gas, lowering filter efficiency. Filter regeneration may allow the filter to return to its original operating capacity for continued operation.

Controlled regeneration may be defined as regeneration initiated by the control system and may include increasing the heat within the filter to the point of combustion thus burning of the trapped particles. Combustion may be initiated by introducing a fuel rich mixture into the exhaust system so that still-unburned fuel within the exhaust gas may combust in the filter. Regeneration may also be initiated by introducing very high heat into the exhaust system to initiate combustion or burn off stored exhaust particles.

An excessive build up of particles within the filter may also create counter-pressure within the exhaust system resulting from the exhaust passage obstruction of an increasingly impermeable substrate. Counter-pressure can cause degradation to the exhaust manifold, exhaust valves, EGR system, or any number of exhaust system components upstream of the filter. It may also prevent the timely exhaust of gas which may result in over-heating and increased engine load.

During controlled regeneration combustion may be initiated within the engine system to initiate soot burning. Oxygen may be limited prior to regeneration so that combustion may be sustained for a predetermined amount of time. By limiting the oxygen available for combustion, the amount of soot burned may be controlled and heat produced by combustion may be limited to the amount of oxygen in the particle filter. Upon termination of controlled regeneration the oxygen supply to the particle filter via exhaust gas may be interrupted. The lack of oxygen within the particle filter causes combustion to terminate and the exhaust system and filter may then return to normal operation.

Uncontrolled or spontaneous combustions may also occur if an excess of solid material is present in the system. When combustion is not initiated by the control system the control system does not limit the amount of oxygen in the particle filter prior to and/or during combustion. Thus, the combustive reaction may be larger, continue longer, and produce more heat than would be permitted by a controlled combustion with a limited oxygen level. Spontaneous combustion may thus lead to degradation to the particle filter and the engine resulting from a large combustive reaction and excessive heat. Uncontrolled regeneration may also contribute to a combustion spreading to exhaust system components outside of the particle filter. Further, uncontrolled combustions may reach a temperature of 600 C which can potentially degrade the filter substrate and lead to filter inoperability. Thus controlled regeneration may be performed regularly to prevent a situation that may contribute to uncontrolled regeneration. Further, a high amount of deposited solid material may allow the combustion to continue for an extended period of time resulting in excessive heat production that may cause the engine components or the substrate to overheat. Regeneration, however, consumes a high amount of fuel and may not be possible during all operating conditions.

Thus by decreasing the heat within the particle filter, spontaneous regenerations can be abated so that the filter can operate for increased periods of time between regenerations. One way that this is achieved is by supplying ambient air to the exhaust gas path at a rate dependent on a measured MAF rate in the filter. The mass flow rate of the exhaust gas flow is generally a function of the presiding operating state of the engine producing the exhaust-gas flow.

Spontaneous ignitions of the material deposited in the particle filter may occur and generate particularly high temperatures if the exhaust-gas flow through the particle filter decreases significantly after a phase of high operating load. This is because exhaust gas flow imparts a cooling function that dissipates heat generated by the filter. Therefore, as the amount of exhaust-gas that enters the filter decreases, the amount of cooling provided by the exhaust gas decreases. Following a high load operation, the temperature within the filter substrate may be high from the reactions within the substrate and the heat from the engine. If the mass of exhaust gas through the filter drops off rapidly, the cooling function of the exhaust gas may no longer be sufficient to return the filter to a suitable temperature.

Therefore, situations in which a motor vehicle equipped with a particle filter is driven over long distances and at high speed and the motor vehicle is subsequently shut down are particularly high-risk, especially since there is the possibility that a regeneration cycle of the particle filter is pending.

One disclosed embodiment provides that the mass flow rate of the exhaust-gas flow be determined, and that ambient air be supplied into the exhaust-gas path as a function of the determined mass flow rate. The supplied ambient air can then impart the desired cooling function.

In some embodiments, a first amount of ambient air is supplied to the exhaust-gas path if the determined mass flow rate has a first value, and for a second amount of ambient air which is greater than the first amount to be supplied if the determined mass flow rate has a second value which is lower than the first value. This means that the supplied ambient air compensates for a decreasing exhaust-gas flow, or a falling mass flow rate of the exhaust-gas flow.

For example, the amount of ambient air supplied may be selected inversely proportionally to the determined mass flow rate. It is preferable for a total mass flow rate through the particle filter, composed of the mass flow rate of the exhaust-gas flow and a supplied-air mass flow rate of the supplied ambient air, to be kept at least approximately constant. This allows for consistent engine behavior, emission control, and filter cooling.

In an embodiment, the ambient air may be compressed before being supplied to the exhaust-gas path. In this way, the amount of ambient air supplied in a given time period can be increased. The compression is also advantageous if the exhaust-gas counter pressure increases due to a large amount of deposits in the particle filter such that the particle filter becomes progressively less permeable.

Embodiments may include an additional step of determining a substrate temperature of the particle filter. In such a case, the supply of ambient air into the exhaust-gas path may be performed additionally as a function of the determined substrate temperature. For example, the magnitude of the demand for cooling of the particle filter at a given point in time may be derived from the determined substrate temperature. It is possible, in particular, for a third amount of ambient air to be supplied to the exhaust-gas path if the determined substrate temperature has a third value, and for a fourth amount of ambient air which is greater than the third amount to be supplied if the determined substrate temperature has a fourth value which is greater than the third value. A higher substrate temperature may indicate a higher demand for cooling, thus a correspondingly greater amount of ambient air may supplied. In particular, the amount of ambient air supplied may be selected proportionally to the substrate temperature.

In some embodiments, the exhaust-gas flow may be interrupted if the substrate temperature exceeds a first threshold value. This precautionary measure may suspend the supply of the exhaust gas if the substrate temperature reaches a certain temperature. The cooling capacity of normally hot exhaust gas may be less that the cooling capacity of the same amount of ambient air. For this reason, in these embodiments, the air supplied for cooling in the case of particularly high substrate temperatures may be ambient air and not a mixture of ambient air and exhaust gas. Under these conditions, the engine may be shut off so as to produce no more exhaust gas and may remain off until the substrate temperature has fallen below a second threshold. Similarly, exhaust-gas flow may be interrupted and ambient air supplied to the exhaust-gas path until the substrate temperature falls below a second threshold value which may be lower than the first threshold value. When the temperature falls below a second threshold value, the vehicle may return to normal operation.

The mass flow rate of the exhaust-gas flow may be proportional to engine load. The mass flow rate may be directly proportional to the load of the internal combustion engine, which may already determined by a control system from the various operating parameters of the engine. Thus, in this embodiment, the mass flow rate of the exhaust-gas flow may be determined without further measures, such as the performing of measurements.

Alternate embodiments may include a mixing valve for mixing the exhaust-gas flow. The supplied ambient air may also be used to increase an exhaust-gas counterpressure. In this way, the load of the internal combustion engine may be increased, which in turn forces increased exhaust-gas production and thus a greater mass flow rate.

The introduction of ambient air into the exhaust system may be achieved using the exhaust gas aftertreatment device (EG-ATD) disclosed herein. A device for exhaust-gas aftertreatment may have a particle filter that may be connected to an internal combustion engine via an exhaust-gas path and which is designed to filter an exhaust-gas flow flowing in the exhaust-gas path. According to the embodiment, the device supplies ambient air into the exhaust-gas path. The EG-ATD may comprise, for example, an induction device, a supply line, a diffuser inlet and/or a compressor.

An additional embodiment may terminate ambient airflow into the particle filter during controlled combustions. This may be in conjunction with limiting an amount of airflow to the particle filter during controlled regeneration. Oxygen may be limited to limit the size of the combustive reaction, the length of combustion, or the heat produced by combustion. In other words, by limiting the amount of excess oxygen from the cylinder in response to the temperature of the filter, the combustion of stored soot particles may be limited and the temperature may be maintained below a maximum temperature threshold. Limiting an amount of oxygen available in the particle filter for combustion may be achieved by limiting a degree of leanness of the fuel provided to the cylinders for combustion. Thus, an air-to-fuel ratio (AFR) of aircharge within the cylinders may be controlled in response to the temperature within the particle filter during regeneration.

During non-controlled regeneration conditions, an embodiment may avoid uncontrolled regeneration by injecting ambient air into the particle filter without limiting the AFR of aircharge for combustion. By not limiting the AFR into the cylinders, combustion and thus engine operation may operate normally. Spontaneous combustion within the intake system may be avoided by the cooling effect of ambient air within the particle filter. An amount of injected ambient air into the exhaust system may be proportional to the MAF of exhaust gas at a point within the exhaust system or particle filter temperature.

Figure 2:
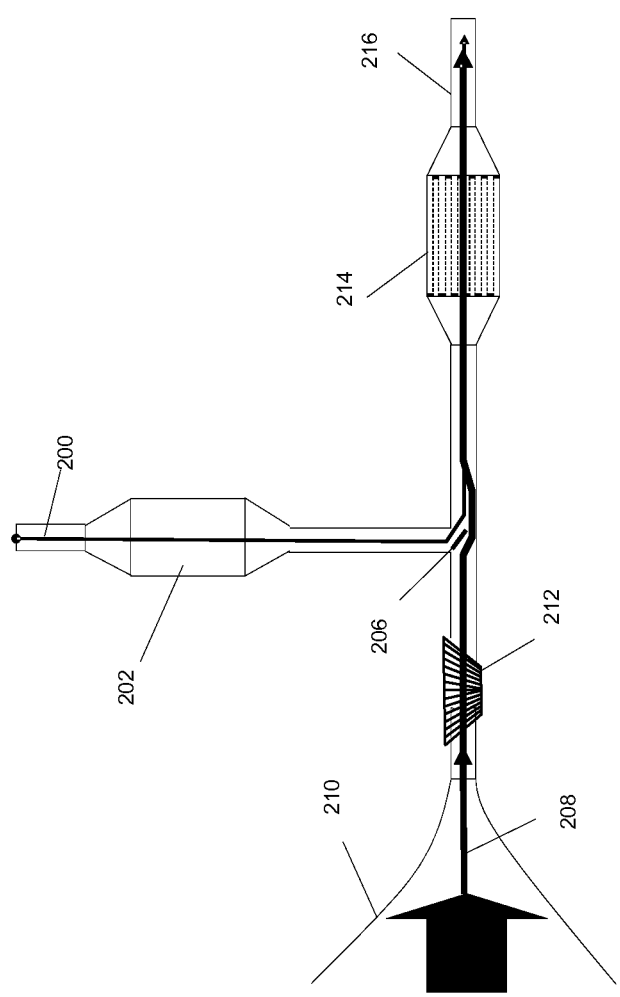
FIG. 2 is an example embodiment of a portion of the exhaust system.
Figure 3:
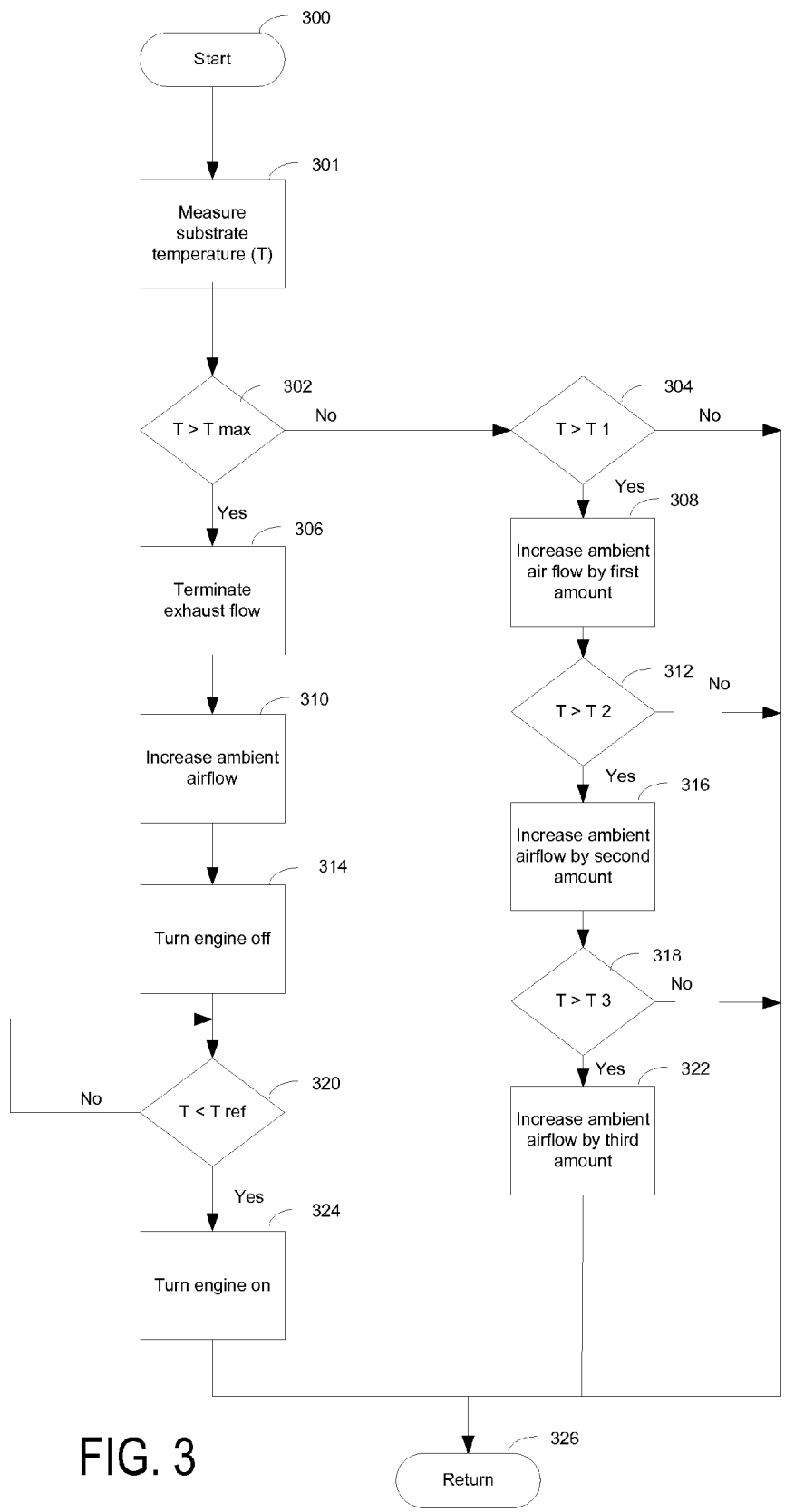
FIG. 3 is an example operating method.
Figure 4:
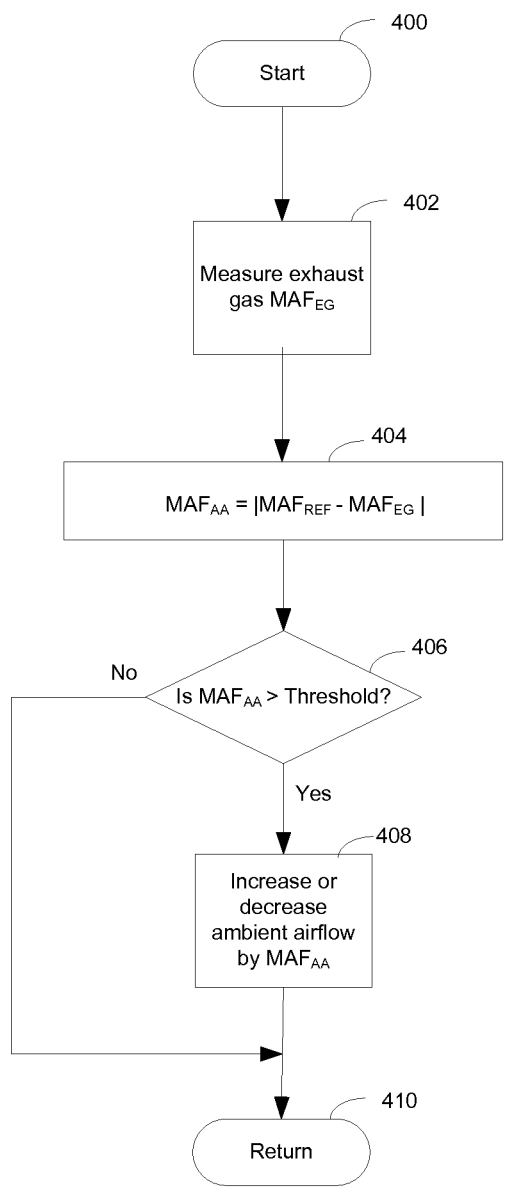
FIG. 4 is an alternate example operating method.

FIG. 1 shows an example embodiment of an exhaust system. FIG. 2 shows a device for exhaust-gas aftertreatment according to the invention. FIG. 3 and FIG. 4 are example operating methods for an engine and exhaust system.

Turning now to FIG. 1, the engine shown may be included in the propulsion system of a motor vehicle. The engine depicted has a four cylinder in-line configuration, however other embodiments may use other engine configurations and have any number of cylinders. Ambient air may enter the intake system 100 via intake pipe 106. During engine on conditions, an amount of aircharge into the intake system may be metered by throttle 104. The position of throttle 104 may be controlled by an actuator 154 responsive to control system 150. Control system 150 may determine a degree of throttle actuation in response to several variables that may include a proportional pedal position (PP) signal from an accelerator pedal position sensor.

In some embodiments (not shown) the intake system may include a compressor and the exhaust system may include a turbine. The turbine may be mechanically coupled to the compressor in a turbocharged system. The turbine may receive energy from exhaust gas causing it to rotate. The compressor may then use the energy from the turbine to compress intake air prior to delivery to the exhaust system.

The intake pipe 106 may be coupled to the intake manifold 108 directly or through a compressor. Air may then enter combustion chamber 120 and, in direct injection systems, be injected with fuel via fuel injector 126. In alternate embodiments, fuel may mix with air upstream of the combustion chambers.

In systems with exhaust gas recirculation (EGR), some content of fuel may be present in the air from exhausted gas rerouted back into the intake system 100 from the exhaust system 130. An amount of exhaust gas and/or fuel from EGR may be determined by the control system and a valve may be actuated by an actuator 154 communicatively coupled to the control system 150.

After combustion, combusted gas may be exhausted from combustion chambers 120 via exhaust manifold 124. A turbocharger may be located downstream of exhaust manifold 124. An EGR inlet may be coupled to the exhaust system 130 downstream of the exhaust manifold and upstream or downstream of a turbine in turbocharged systems.

One or more emission control devices may be present within the exhaust system. One such device may be first emission control device (ECD) 134 coupled downstream of the exhaust manifold. This device may be a catalytic converter or a diesel particulate filter (DPF). An ambient air valve 146 may be located downstream of first ECD 134 and upstream of a second ECD 140 within the exhaust system. The valve 146 may be actuated by actuator 154 via control system 150. One or more additional ECD (not shown) may be located upstream or downstream of valve 146. Valve 146 may be responsive to exhaust manifold sensor 128 or ECD sensor 144 and may measure temperature and/or pressure and may be communicatively coupled to the control system.

Ambient air intake may be induced into ambient air pipe 148 by a suitable method that may utilize pressure differentials or compression. Upon entering pipe 148, ambient air may be delivered to the exhaust system via valve 146. Ambient air, exhaust gas, or some combination thereof may combine within the exhaust system before entering a second ECD 140. An ECD may be a wall-flow filter, such as a diesel particulate filter in which particles are removed from exhaust gas onto the walls of the filter. Exhaust gas may then exit the exhaust system via tail pipe 142.

An embodiment of the disclosed EG-ATD is shown in FIG. 2, the embodiment comprises an ECD 202, a particle filter 214, a mixing valve 206, a compressor 212, and a diffuser inlet 210. An exhaust-gas flow 200 from an engine (not illustrated) may be conducted firstly via an exhaust-gas aftertreatment device ECD 202. In other embodiments, the ECD may be omitted or provided at a different location. The ECD 202 may, for example, be provided for the catalytic reduction of aggressive gas constituents or nitrogen oxides to lower harmful emissions and prevent damage to downstream components as a result of undesired uncontrolled chemical reactions.

In the example shown, the exhaust-gas flow 200, after passing through the ECD 202, is supplied via a mixing valve 206 to a particle filter 214, for example a diesel particle filter.

In the mixing valve 206, an amount of ambient air 208 is admixed to the exhaust-gas flow 200. The introduction of ambient air within mixing valve 206 both decreases the temperature of overall flow, and increases an overall mass flow rate through the particle filter 214. Both effects result in increased cooling of the particle filter 214, thus reducing the likelihood of degradation to the particle filter resulting from high temperatures which could arise during the course of spontaneous combustion of solid matter deposited in the particle filter.

Ambient air may be inducted via a diffuser inlet 210 which may be arranged, for example, on an underside of the vehicle or behind a radiator grille. Here, an optional compressor 212 may compress the inducted ambient air in order to increase the amount of ambient air supplied and match the air pressure thereof to the exhaust-gas pressure prevailing upstream of the particle filter 214.

After the mixture of exhaust gas and ambient air has passed through the particle filter 214, it may be released through an exhaust tailpipe 216 into the environment. Alternatively, the gas mixture filtered by the particle filter 7 may also be supplied at least in part to the internal combustion engine for EGR. Note that the gas mixture may already have an oxygen fraction owing to the admixed ambient air. Accordingly, a smaller amount of air can be admixed during the production of the fuel mixture.

FIG. 3 shows an example operating method for the system disclosed. At 301, the temperature of a substrate may be determined. If the temperature is found to be above a max ($T_{max}$) value at 302, exhaust flow through the EG-ATD may end. $T_{max}$ may correspond to a predetermined temperature threshold to protect the particle filter from spontaneous combustion or an increased likelihood uncontrolled regeneration.

Exhaust flow may be terminated by several means. For example, a purge may be coupled to the intake system, a control system that may be responsive to operating conditions may open a valve, coupling a purge pipe to the exhaust system upstream of one or more EG-ATDs. Further, a second valve between the purge and the EG-ATD may close to prevent exhaust gas from entering the EG-ATD. This minimizes the heat from the exhaust gas transmitted to the EG-ATD and the further likelihood of uncontrolled regeneration. Additional cooling may be achieved by directing a max amount of ambient air into the EG-ATD at 306. Further, the engine may be temporarily disabled so as to prevent the creation of additional exhaust gas and combustion heat that could induce uncontrolled regeneration at 314. The temperature of the substrate may continue to be monitored throughout ambient air cooling at 320. If the temperature of the substrate falls below a temperature T, the engine may be turned back on at 320 for regular operation. In other embodiments alternatively or additionally to the engine turning off, combustions may be suspended by de-coupling the engine from an air intake, suspending fuel injection, or suspending ignition spark or compression ignition. These processes may be reinitiated in addition to or alternatively to turning the engine on after the temperature has fallen below a second threshold at 320.

Returning to 302, if the temperature of the substrate is not found to be above a maximum temperature it may be determined if the substrate is above a first temperature T1. If the substrate is found to be above T1, the amount of ambient air delivered to the EG-ATD may be increased or initiated at 308, to an ambient MAF of A1. It may then be determined at 312 if the temperature of the substrate is above a second temperature T2. If the temperature is above T2 then an amount of ambient air delivered to the EG-ATD may be increased above A1 to a higher MAF A2 at 308. T2 may be greater than T1. The difference between A1 and A2 may be greater or less than the difference between A1 and the original amount of ambient MAF (which may be zero). At 318 it may be determined if temperature of the substrate is above a third temperature T3 above the first and second temperature. If the temperature is found to be above T3 the ambient MAF delivered to the EG-ATD may be increased at 322 to A3. Similarly, T3 may be greater that T1 and T2 and MAF A3 may be greater than A2 and A1 though the difference between A3 and A2 may be greater or less than the difference between A2 and A1.

Other embodiments may continue to check if T is above a multitude of temperature thresholds and may continue to increase the ambient MAF delivered to the EG-ATD in response to a temperature exceeding the threshold. Similarly, embodiments may decrease an ambient MAF in response to the substrate temperature falling below one or more thresholds. The process may repeat at 326.

FIG. 4 shows an additional example operating method. Exhaust gas MAF into the EG-ATD ($MAF_{EG}$) may be determined at 402. At 404, $MAF_{EG}$ may be compared to a reference MAF ($MAF_{REF}$) that may correspond to an earlier $MAF_{EG}$ or a predetermined value that may be dependent on operating conditions. The difference between $MAF_{EG}$ and $MAF_{REF}$ may be referred to as $MAF_{AA}$. If $MAF_{AA}$ is found to be above a threshold at 406, an amount of ambient air delivered to the EG-ATD may be increased or decreased by $MAF_{AA}$ so that the MAF through the EG-ATD is equal (or nearly equal) to $MAF_{REF}$. By this method, when engine load conditions abruptly drop off, the MAF through the EG-ATD may remain constant so as to maintain cooling capacity from air flow through the EG-ATD.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine operating method, comprising:
   during controlled filter regeneration and during non-controlled regeneration conditions,
      supplying ambient air into an exhaust-gas path as a function of a mass flow rate of an exhaust-gas flow to a particle filter;
      increasing ambient air supplied to the exhaust-gas path by a first amount if the mass flow rate has a first value; and
      increasing ambient air supplied to the exhaust-gas path by a second amount if the mass flow rate has a second value which is lower than the first value, the second amount greater than the first amount, wherein the mass flow rate is determined by virtue of a load of an engine being determined,
   wherein a total mass flow rate through the particle filter is a function of the mass flow rate of the exhaust-gas flow and a supplied-air mass flow rate of the ambient air and is kept constant, and wherein ambient air is compressed before being supplied to the exhaust-gas path, an amount of ambient air supplied being inversely proportional to the supplied-air mass flow rate from the engine.

2. The method of claim 1, further comprising determining a substrate temperature of the particle filter, wherein a supply of ambient air into the exhaust-gas path is delivered additionally as a function of the substrate temperature.

3. The method of claim 2, in which a third amount of ambient air is supplied to the exhaust-gas path if the substrate temperature has a third value, and in which a fourth amount of ambient air which is greater than the third amount is supplied to the exhaust-gas path if the substrate temperature has a fourth value which is greater than the third value.

4. The method of claim 2, in which the exhaust-gas flow is interrupted if the substrate temperature exceeds a first threshold value.

5. The method of claim 4, in which the exhaust-gas flow is interrupted and ambient air is supplied to the exhaust-gas path until the substrate temperature falls below a second threshold value which is lower than the first threshold value.

6. The method of claim 1, in which a mixing valve for mixing the exhaust-gas flow and ambient air supplied is used to increase an exhaust-gas counterpressure.

7. An engine method, comprising:
during a controlled filter regeneration, not injecting ambient air into exhaust and limiting an amount of excess oxygen from combusting cylinders based on filter temperature; and
to avoid spontaneous filter regeneration during non-controlled regeneration conditions, injecting ambient air into exhaust without limiting the amount of excess oxygen from combusting cylinders, an amount of injected ambient air proportional to engine exhaust airflow, wherein injecting ambient air into exhaust without limiting the amount of excess oxygen is based on filter temperature exceeding a predetermined temperature threshold and wherein engine combustion is suspended by de-coupling the engine from an air intake, suspending fuel injection, or suspending ignition spark or compression ignition in response to the filter temperature exceeding the predetermined temperature threshold.

8. The method of claim 7, wherein ambient air is compressed before being supplied to exhaust.

9. The method of claim 7, wherein the exhaust airflow is determined by virtue of a load of an engine being determined.

10. The method of claim 7, wherein an amount of excess oxygen is further controlled to limit a size of a combustive reaction, a length of combustion, or heat produced by combustion.

11. The method of claim 7, wherein the engine is temporarily disabled in response to the filter temperature exceeding the predetermined temperature threshold, and the engine is maintained disabled until the filter temperature is less than a second temperature threshold, the second temperature threshold being lower than the predetermined temperature threshold.

12. The method of claim 7, wherein ambient air is inducted via a diffuser inlet.

13. An engine operating method, comprising:
during controlled filter regeneration and during non-controlled regeneration conditions,
supplying ambient air into an exhaust-gas path as a function of a mass flow rate of an exhaust-gas flow to a particle filter;
increasing ambient air supplied to the exhaust-gas path by a first amount if the mass flow rate has a first value;
increasing ambient air supplied to the exhaust-gas path by a second amount if the mass flow rate has a second value which is lower than the first value, the second amount greater than the first amount, wherein the mass flow rate is determined by virtue of a load of an engine being determined; and
determining a substrate temperature of the particle filter, wherein a supply of ambient air into the exhaust-gas path is delivered additionally as a function of the substrate temperature, and where the exhaust-gas flow is interrupted if the substrate temperature exceeds a first threshold value.

14. The method of claim 13, wherein the exhaust-gas flow is interrupted and ambient air is supplied to the exhaust-gas path until the substrate temperature falls below a second threshold value which is lower than the first threshold value.

15. The method of claim 13, wherein ambient air is compressed before being supplied to the exhaust-gas path.

16. The method of claim 13, wherein an amount of excess oxygen is controlled to limit a size of a combustive reaction, a length of combustion, or heat produced by combustion.

17. The method of claim 13, wherein ambient air is inducted via a diffuser inlet.

* * * * *